United States Patent [19]

Watanabe

[11] 4,028,607
[45] June 7, 1977

[54] INVERTER CONTROL SYSTEM
[75] Inventor: Atsumi Watanabe, Hitachi, Japan
[73] Assignee: Hitachi, Ltd., Japan
[22] Filed: Apr. 8, 1975
[21] Appl. No.: 566,091
[52] U.S. Cl. .................................. 321/5; 321/18
[51] Int. Cl.² .................................. H02M 7/00
[58] Field of Search ........................... 321/2, 5, 18
[56] References Cited
UNITED STATES PATENTS

| | | | |
|---|---|---|---|
| 3,358,211 | 12/1967 | Ekstrom | 321/35 |
| 3,465,234 | 9/1969 | Phadke | 321/5 |
| 3,848,175 | 11/1974 | Demarest | 321/14 X |

Primary Examiner—William M. Shoop
Attorney, Agent, or Firm—Craig & Antonelli

[57] ABSTRACT

An inverter in the D.C. power transmission is controlled by gate pulses which are synchronized with voltages of an A.C. system and whose interval is constant for respective arms of the inverter. Simultaneously therewith, in order to prevent the inverter from causing a commutation failure due to a fault in the A.C. system, a control voltage for making the gate pulses is corrected by the use of the lowest one of the phase voltages or line voltages of the A.C. system. The control voltage becomes greater as the phase voltage or the line voltage lowers more from a rated voltage. When the control voltage increases, the gate pulses are provided at a timing of a larger advanced control angle so as to maintain the extinction angle constant.

8 Claims, 15 Drawing Figures

INVERTER CONTROL SYSTEM

BACKGROUND OF THE INVENTION

This invention relates to an inverter control system in the D.C. power transmission, and more particularly to a control system which is suitable in case of controlling the gate pulse interval to be constant.

As a phase control system for the gate pulses of an inverter in the D.C. power transmission, the so-called each-phase control system has hitherto been adopted. It determines the phases of the gate pulses of the respective arms of the inverter in such way that gate pulse phase shifters which employ the commutation voltages of the respective arms for their synchronizing power sources are disposed in correspondence with thyristor valves of the arms. In order to perform a stable operation without any commutation failure even when a balance or unbalance fault occurs in an A.C. system on the inverter side in the case of adopting such each-phase control system, control may be made, for example, so as to attain a prescribed extinction angle $\gamma_o$ by detecting a drop of the commutation voltage and increasing the advanced control angle $\beta$ to the amount of an increment of the overlapping angle ascribable to the drop of the combination voltage as has been proposed in patent application Ser. No. 78,575/1969.

The control of increasing the advanced control angle $\beta$ in dependence on the drop of the communication voltage, however, cannot always achieve the stable operation in case of using a gate pulse phase shifter, as proposed in patent application Ser. No. 129,412/1972, by which phase shifts of the synchronizing power sources are averaged by means of a voltage-controlled oscillator so as to render the gate pulse interval constant. This is obvious when, by way of example, a drop of the phase voltage is supposed. Even if the phase of one commutation voltage leads, that of another commutation voltage will lag to the same amount, so that the averaged phase variation is zero. The foregoing control of increasing the advanced control angle $\beta$ according to the drop of the commutation voltage cannot cope with the changes of the phases of the commutation voltages. Therefore, the arm at which the phase of the commutation voltage leads falls into an insufficient extinction angle and can cause a commutation failure.

SUMMARY OF THE INVENTION

It is accordingly an object of this invention to provide an inverter control system which is so contrived that, when a fault takes place in an A.C. system, the phase of a gate pulse can be instantly controlled in the direction of stabilizing the operation of an inverter.

This invention intends to accomplish the object by separately disposing means to output the gate pulses accurately at a fixed interval and means to shift the phases of the gate pulses, to be bestowed on the inverter, in dependence on the state of operation and by introducing into the phase shifting means a signal corresponding to the state of voltages in the A.C. system.

DETAILED DESCRIPTION OF THE PREFERRED EMBODIMENT

As previously stated, this invention realizes the control of fixing the gate pulse interval, and further, prevents an inverter from failing in commutation even at faults occurring in an A.C. system. Hereunder this invention will be explained in detail in conjunction with an embodiment. First of all, description will be made of what influences the faults of the A.C. system have on the inverter.

Figure 1:
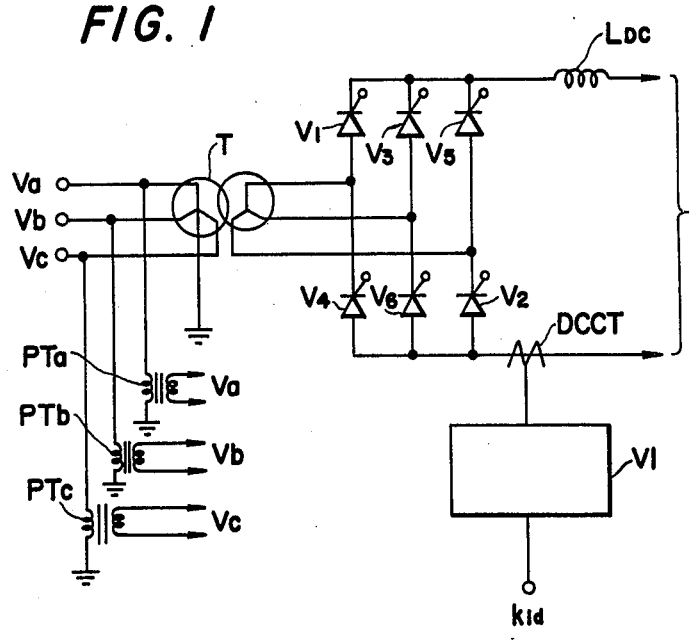
FIG. 1 is a connection diagram showing the arrangement of an inverter in the D.C. power transmission.

An example of a D.C. power transmission system is shown in FIG. 1. Referring to the figure, T designates a transformer, $V_1 - V_6$ arms of an inverter as constructed of thyristor valves, and $L_{DC}$ a D.C. reactor. A D.C. side input of the inverter is connected through D.C. lines to remote terminals. A.C. side terminals of the transformer T are connected to an A.C. system, the respective phases of which have voltages $V_a$, $V_b$ and $V_c$. The voltages are detected through voltage or potential transformers $PT_a$, $PT_b$ and $PT_c$ and are delivered to a control circuit (not shown) including a gate pulse phase shifter, respectively. DCCT denotes a D.C. current transformer, while VI indicates a current - voltage converter. The remote terminals are of the same arrangement.

Figure 2:
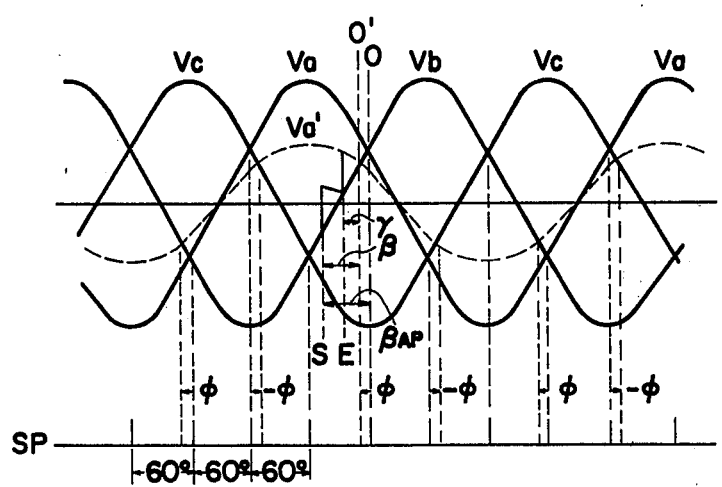
FIG. 2 is a waveform diagram for explaining phase changes of line voltages at a fault of an A.C. system.
Figure 3:
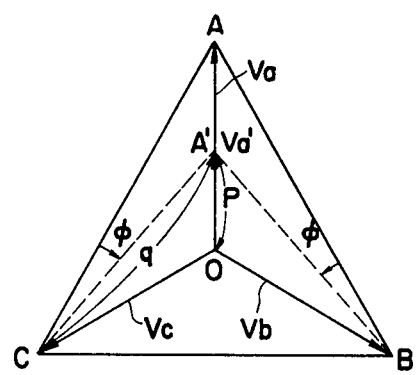
FIGS. 3 and 4 are vector diagrams for explaining voltages at the one-line earthing fault and two-line earthing fault of the A.C. system, respectively.

Normally, the three-phase voltages $V_1$, $V_b$ and $V_c$ are balanced as shown by solid-line waveforms in FIG. 2. Now, let's consider a case where the one-line earthing occurs in the A.C. system and where the voltage $V_a$ of the phase-a drops as shown at $V_a'$ by a broken line. Where the transformer connection is the star-star connection ( $\curlywedge \curlywedge$ ) as in FIG. 1, the commutation voltages are equal to the line voltages, and their zero points are intersection points of the phase voltages. Accordingly, when the voltage $V_a$ lowers to $V_a'$, the phase of the intersection point or that of the commutation voltage leads by $\phi$ at the phase-b and lags by $\phi$ at the phase-c as illustrated in FIG. 2. While the commutation voltage also drops, the rate is smaller than the drop rate of the phase voltage. This state is illustrated in FIG. 3 by a vector diagram. The magnitude of the phase voltage is now let to be $p$ in the p.u. value (normalized value) whose base is the rated phase voltage $V_a$ (OA in FIG. 3). The line voltage (commutation voltage) in the case where the phase voltage is $p$, is assumed to become $q$ in the p.u. value whose base is the rated line voltage (CA or AB). Let $\phi$ indicate the change of the phase of the line voltage in the case where the phase voltage drops from 1 to $p$ in the p.u. value. Then, the relationship among $p$, $q$ and $\phi$ is easily obtained by drawing a diagram and becomes as in FIG. 5. In case of the earthing of two lines, for example, the earthing of the phase-a and phase-b, a vector diagram is as in FIG. 4. In this case, the line voltage between the phase-a and phase-b drops at a rate equal to that of the phase voltage, and it becomes $p$ likewise to the phase voltage in terms of the p.u. value having the foregoing base. The magnitude of the line voltages between the phase-c and phase-a and between the phase-b and phase-c becomes $q$ as in the case of the one-line earthing. The magnitude of the changes of the phases similarly becomes $\phi$ as shown in the figure.

In case of the three-line earthing, the line voltage is $p$ at all the three phases, and no phase change is involved.

As is well known, the relation among the commutation voltage, the extinction angle $\gamma$ and the advanced control angle $\beta$ is expressed by:

$$\cos \gamma - \cos \beta = \frac{\sqrt{2} \times I_d}{E_a} \qquad (1)$$

where $\gamma$ denotes the extinction angle, $\beta$ the advanced control angle, $E_a$ the commutation voltage, $I_d$ the D.C. current, and $x$ the commutation reactance (in $\Omega$). The reference of the phases of the angles $\gamma$ and $\beta$ is the zero point of the commutation voltage.

Let X indicate the commutation reactance in the p.u. value whose base is the capacity of the transformer, and $z$ indicate the D.C. current in the p.u. value whose base is the rated value thereof. Then, Eq. (1) becomes as follows:

$$\cos \gamma - \cos \beta = X (z/q) \qquad (2)$$

Now, consider a case where $X = 0.2$ and $z = 0.1$. How the advanced control angle $\beta$ need be controlled with changes of $q$ in order to keep the extinction angle $\gamma$ at 20° in this case, has been calculated and is illustrated at A in FIG. 6.

In the each-phase control, the gate pulses are generated in synchronism with the phases of the cummutation voltages after the change of the phase voltage as previously stated by citing patent application Ser. No. 78,575/1969, and hence, control voltages corresponding to the curve A in FIG. 6 may be bestowed on the gate pulse phase shifter.

With the pulse phase shifter of the gate pulse interval-fixing system as proposed in the cited patent application Ser. No. 129,412/1972, however, the inverter cannot be stably operated by the above method in some cases as previously stated. The reason will now be explained by taking as an example the case of the one-line earthing (to which the vector diagram of FIG. 3 corresponds). The gate pulse phase shifter disclosed in the patent application operates by making use of the zero points of the commutation voltages as synchronizing pulses. When the voltage $V_a$ lowers to the value $V_a'$, the positions of the synchronizing pulses change by $\phi$ or $-\phi$ as indicated by pulses at SP in FIG. 2. Since, however, the gate pulse phase shifter determines the gate phase with reference to the mean value, $\phi$ and $-\phi$ cancel each other, and ultimately, the phasic position before the change or the zero point of the line voltage at the voltage balance becomes the reference.

By way of example, consider the commutation from the arm $V_5$ to the arm $V_1$ in FIG. 1. The advanced control angle $\beta$ shown by the curve A in FIG. 6 corresponds to a period from a commutation initiating time S to the zero point O' of the line voltage as indicated in FIG. 2. Herein, the extinction angle $\gamma$ is obtained as indicated in FIG. 2. In the case of the conventional each-phase control, the gate phase is determined with reference to the point O', and hence, the control voltage conforming to the curve A in FIG. 6 may be given to the gate pulse phase shifter. On the other hand, in the case of the control of rendering the gate pulse interval constant, the gate phase is determined with reference to a point O even at the one-line earthing. The control voltage need therefore be given to the gate pulse phase shifter so that the advanced control angle may become $\beta + \phi = \beta_{AP}$.

Figure 5:
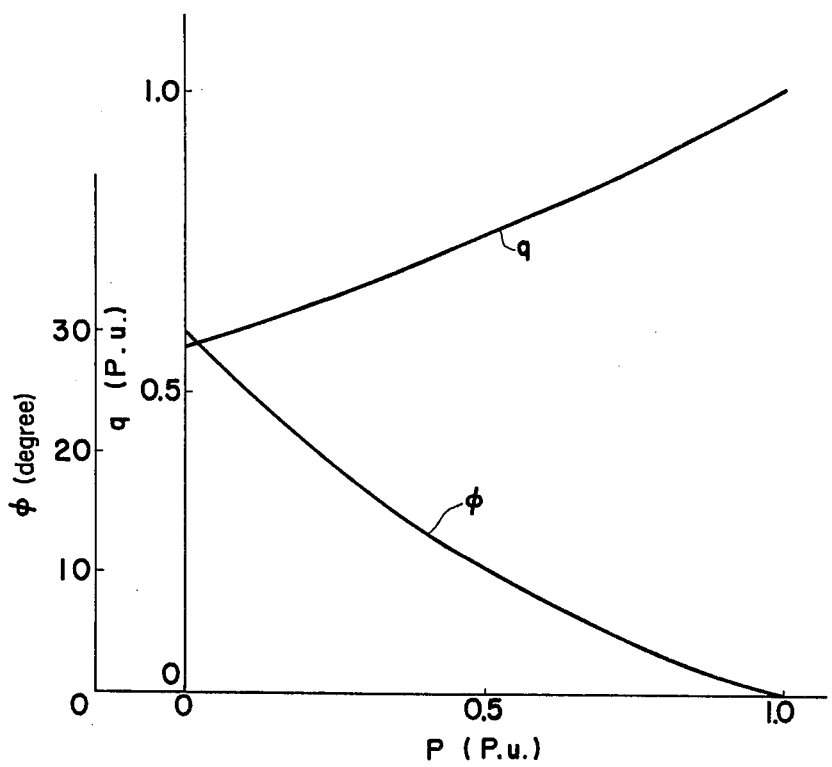
FIGS. 5 to 7 are graphs for explaining advanced control angles required for the inverter at the faults of the A.C. system.
Figure 6:
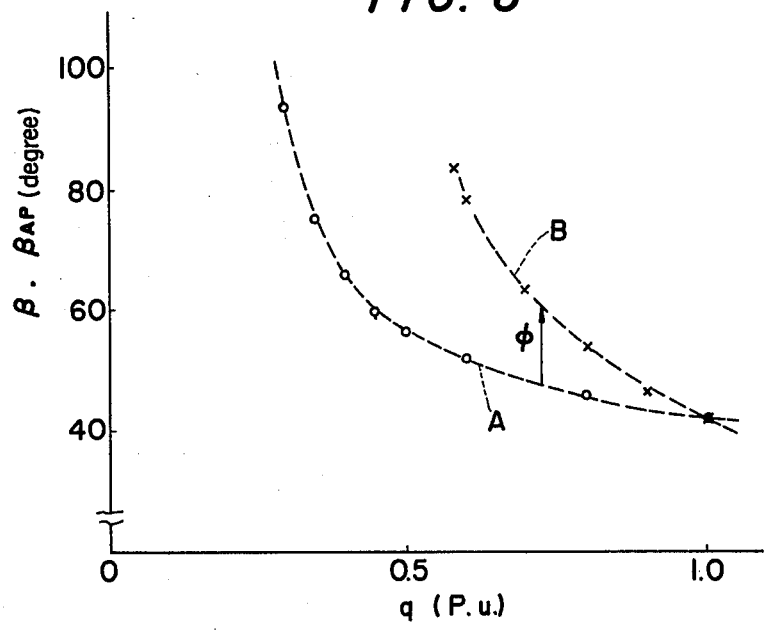

The value of $\beta_{AP}$ is illustrated at a curve B in FIG. 6. At, for example, $q = 0.9$, FIG. 5 teaches $p = 0.8$ and $\phi = 3°$, and therefore, the curve B has been obtained by adding 3° to the curve A.

In the case of the three-line earthing, the phases of the commutation voltages do not change, and the control may be made so as to attain the curve A.

Figure 4:
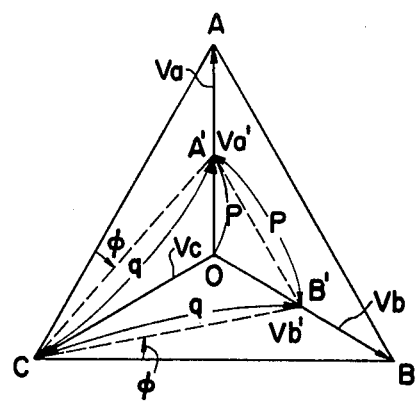

In the case of the two-line earthing, as understood from FIG. 4, there are the phases which ought to be controlled as the curve B and the phase which may be controlled as the curve A. Even when only one phase fails in commutation, the running of the inverter is impossible. After all, the control need be made so as to attain the curve B.

In this manner, in the case of performing the gate pulse interval-fixing control, the system which merely corrects the control signal in correspondence with the drop of the commutation voltage so as to increase the advanced control angle $\beta$ is not preferable because the control method differs greatly in dependence on the kind of the faults. That is, it necessitates a complicated and expensive circuit and is less reliable that when any fault of the A.C. system takes place, the sort of the fault is discriminated to change-over the control methods.

This invention does not take notice of the mere commutation voltage, but it utilizes the phase voltages and the line voltages on the A.C. side of the transformer for the inverter. It proposes that, in case where any fault occurs in the A.C. system and where a voltage drop arises, the lowest one of the phase voltages or the line voltages is selected, whereupon the control signal of the gate pulse phase shifter is corrected so as to determine the advanced control angle $\beta$ in dependence on the drop width of the particular voltage.

It will be explained that controls dependent upon the phase voltages may be made when the earthing faults take place.

Figure 7:
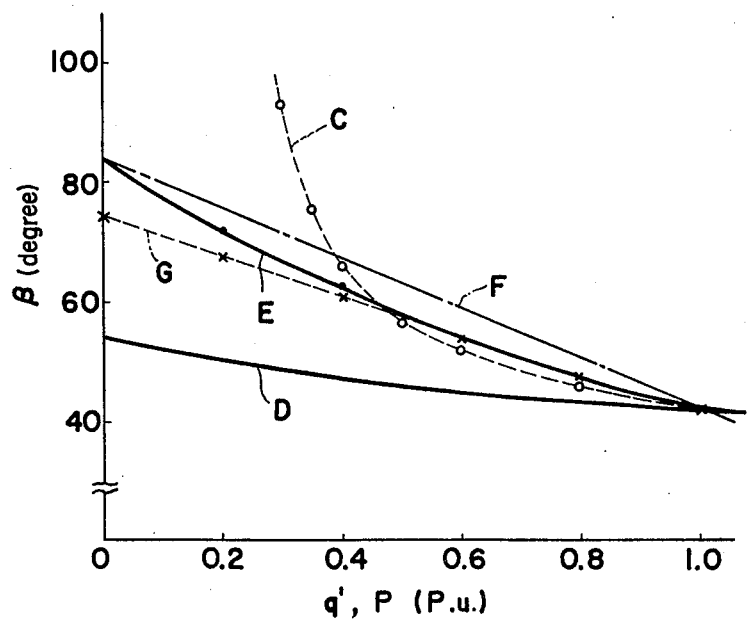

FIG. 7 illustrates what values the advanced control angle $\beta$ should be made according to the drop of the phase voltage $p$. In the figure, a curve C indicates the case of the three-phase short-circuit. In this case, the values $p$ (phase voltages) and $q$ (line voltages) lower at the equal rates, and no phase difference is involved. Therefore, the curve C is the same as the curve A in FIG. 6. As regards a curve D in FIG. 7, the values $q$ corresponding to the values $p$ are evaluated from FIG. 5, and the values $\beta$ are obtained by substituting the evaluated values into Eq. (2). The reference of the values is the zero point of the commutation voltage at the fault (the point O' in FIG. 2). As in the calculation stated before, $X = 0.2$ and $I_d = 1.0$.

In the control of rendering the gate pulse interval constant, it is necessary to determine the advanced control angle $\beta$ with reference to the point O in FIG. 2. The values $\beta$ are obtained by adding the phase change $\phi$ in FIG. 2 to the curve D, and become as indicated by a curve E.

In the case of the two-line earthing, as in the previous explanation, there are the phase to be controlled as the curve C and the phases to be controlled as the curve E. In order to stably effect all the commutations, a larger value between the values C and E need be selected. On the other side, it is usual in the D.C. power transmission system that the running is stopped when $p$ becomes smaller than 0.5 in the case of the two-line or three-line earthing. As apparent from FIG. 7, the curves C and E are very close in a range of $p \geq 0.5$. In conclusion, by making the control as the curve E in the whole range of $p$, the inverter having the gate pulse interval controlled to be constant can be stably operated even when the earthing faults take place.

Description will now be made of a case of the two-line short-circuit fault.

Figure 8:
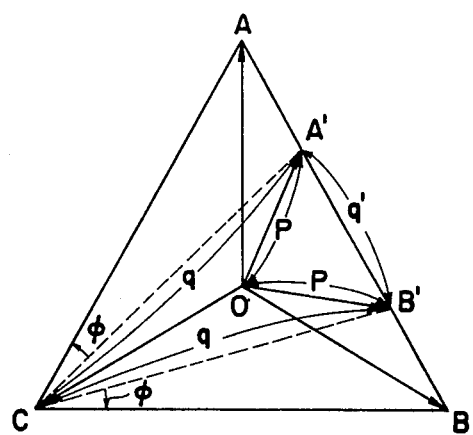
FIG. 8 is a vector diagram for explaining voltages at the two-line short-circuit of the A.C. system.

A vector diagram in this case is shown in FIG. 8. In the figure, $p$ denotes the magnitude of the phase voltage at the fault by letting a value of the phase voltage in the normalcy (OA in the figure) be 1 p.u., while $q$ and $q'$ denote the magnitudes of the line voltages at the fault by letting a value of the line voltage in the normalcy (AB etc. in the figure) be 1 p.u.

Assuming that the transformer for the inverter is of the star - star connection ($\curlywedge \curlywedge$), the commutation voltages are equal to the line voltages.

Figure 9:
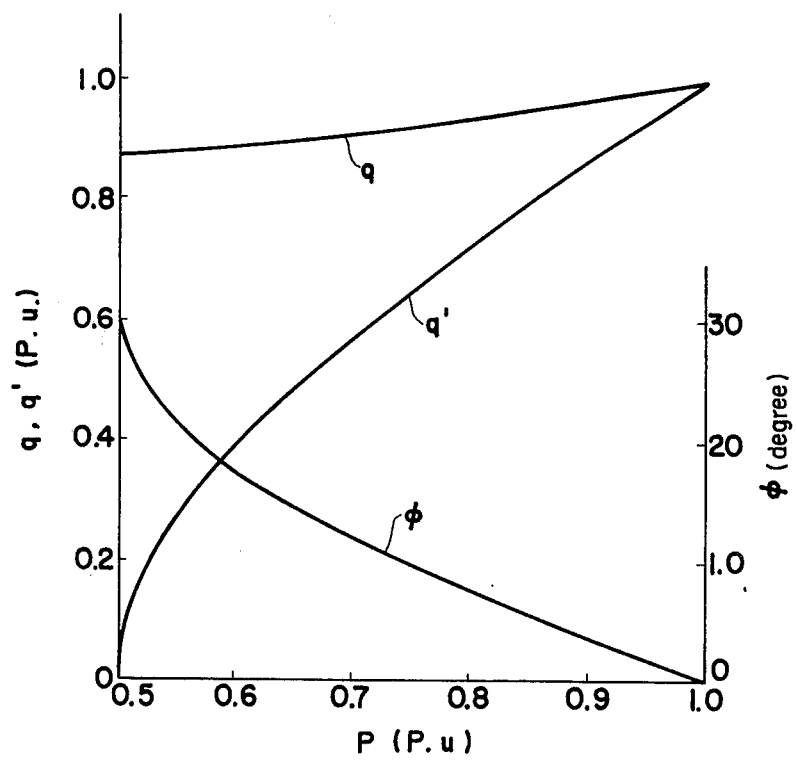
FIGS. 9 and 10 are graphs for explaining voltage drops and phase shifts at the two-line short-circuit fault of the A.C. system.
Figure 10:
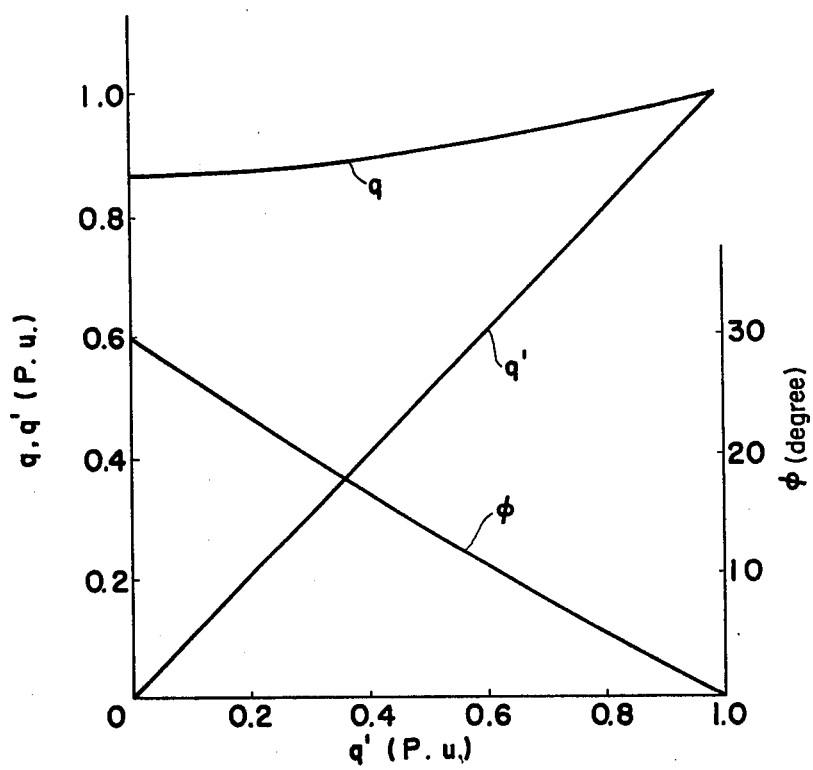

FIG. 9 illustrates the relations between the quantity $p$ and the quantities $q, q'$ and $\phi$ (the change of the phases of the line voltages). When the relation between the values $p$ and $q'$ is referred to, the quantity $q'$ exhibits a larger drop width. In the case of the two-line short-circuit, accordingly, it is not satisfactory to increase the advanced control angle $\beta$ in dependence on the drops of the phase voltages as in the cases of the earthing faults, and it is better to make the control in dependence on the drops of the line voltages. FIG. 10 illustrates the relation between the line voltage $q'$ between the phases $a$ and $b$ and the commutation voltage and the relation between the line voltage $q'$ and the phase change of the commutation voltage. Symbols $q, q'$ and $\phi$ are equivalent to those in FIG. 8.

There has been calculated what values the advanced control angle $\beta$ may be made where the line voltages lower to the values $q$ and $q'$ as in FIG. 8 due to the two-line short-circuit. The result is included as a curve G in FIG. 7. Here, regarding the curve G, the axis of abscissas represents the line voltage $q'$ between the phases $a$ and $b$. It has been evaluated in the same way as in the cases of the earthing faults. More specifically, in the case of the two-line short-circuit of the phases $a$ and $b$ as in FIG. 8, the voltage of the commutation from the arm $V_1$ to the arm $V_3$ in FIG. 1 is equal to $q'$, and the phase does not change. Therefore, the advanced control angle for keeping the extinction angle of 20° becomes the curve C in FIG. 7. The voltage of the commutation from the arm $V_3$ to the arm $V_5$ is equal in magnitude to $q$, and leads in phase by $\phi$ over the normal condition. Therefore, the value $\beta$ for the magnitude $q$ corresponding to the value $q'$ in FIG. 10 is evaluated by Eq. (2), the value $\phi$ corresponding to the same value $q'$ is obtained from FIG. 10 and is added to the evaluated value $\beta$, and a control voltage corresponding to the resultant value ($\beta + \phi$) may be impressed on the gate pulse phase shifter. Obtained in this way is the curve G in FIG. 7. In the case of the two-line short-circuit, the extinction angle of 20° can be held by performing the control along the curve G.

As understood from FIG. 7, the curve E obtained as to the earthing fault by taking the phase voltage $p$ on the axis of abscissas and the curve G obtained as to the short-circuit fault by taking the line voltage $q'$ on the axis of abscissas are in close proximity.

Accordingly, an inverter control system which can cope with any of the earthing and short-circuit faults can be acquired by the method of selecting the lowest one of the line voltages or the phase voltages and increasing the advanced control angle $\beta$ in correspondence with the lowering width of the selected voltage.

Figure 12:
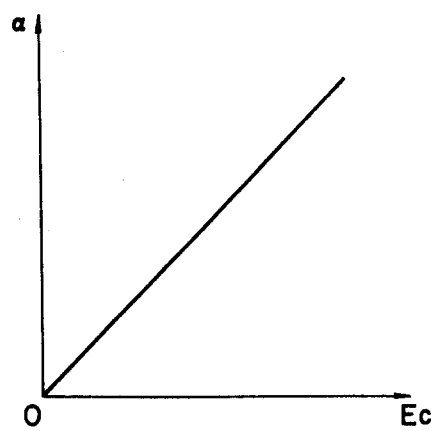
FIG. 12 is a diagram showing an example of the characteristic of a circuit to be used in the embodiment in FIG. 11, FIGS. 13 and 14 are block diagrams for explaining examples of concrete circuits for generating gate pulses at a fixed interval as can be employed in this invention, respectively.
Figure 11:
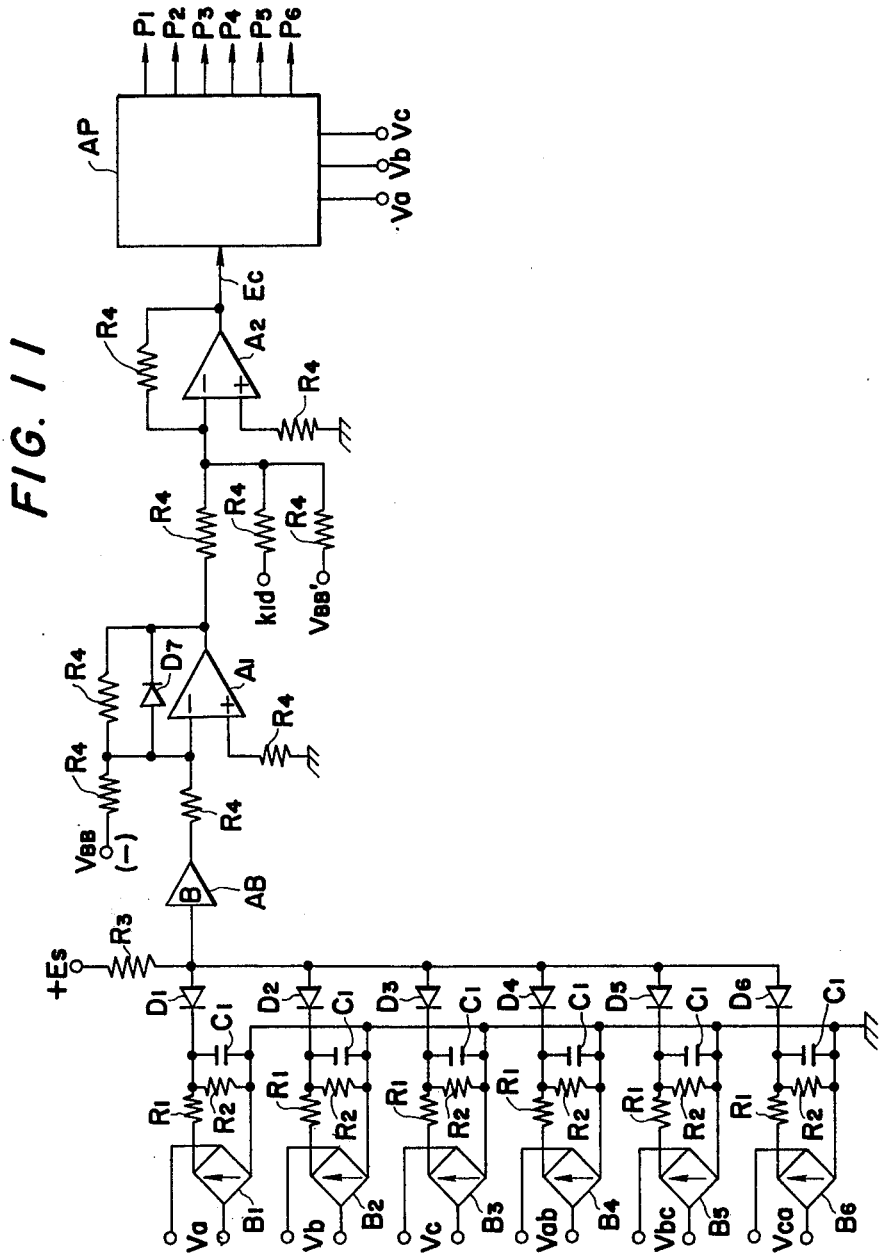
FIG. 11 is a block diagram showing the essential portions of an embodiment of this invention.

FIG. 11 shows an example of a circuit which concretely actualizes such idea of this invention. The embodiment intends to excetue the control through the approximation of the curve E by a straight line F in FIG. 7. In FIG. 11, AP indicates the gate pulse phase shifter of the gate pulse interval-fixing control system. $V_a$, $V_b$ and $V_c$ represent synchronizing power sources, which are respectively led from the potential transformers $PT_a$, $PT_b$ and $PT_c$. Output firing pulses $P_1 - P_6$ become the gate pulses of the arms constructed of the thyristor valves $V_1 - V_6$ in FIG. 1. The gate pulse phase shifter shall have a characteristic in which, as illustrated in FIG. 12, the control input voltage $E_c$ and the retarded control angle of the output $\alpha$ are proportional. Concrete examples will be explained later with reference to FIGS. 13 and 14.

Full-wave rectifier bridges $B_1 - B_6$ rectify the phase voltages $V_a$, $V_b$ and $V_c$ and line voltages $V_{ab}$, $V_{bc}$ and $V_{ca}$ of the A.C. system and convert them into D.C. voltages, respectively. Resistors $R_1$ and $R_2$ and a capacitor $C_1$ constitute a circuit which divide and smooth the output voltage of each of the bridges $B_1 - B_6$.

Diodes $D_1 - D_6$ and a resistor $R_3$, which has a resistance higher than that of the resistor $R_2$, are connected to a positive power source $+E_s$. A voltage of the smallest absolute value among the voltages across the capacitors $C_1$ is selected by this circuit. Voltages to be applied to the diode $D_1 - D_6$ are any positive voltages. The diode of the least positive voltage, namely, of the lowest potential turns "on," whereas the other diodes are reverse-biased. It is therefore apparent that the above selection is made. A buffer amplifier AB has a high input impedance and a low output impedance, and the polarities of its output and input voltages shall be the same. $A_1$ and $A_2$ designate operational amplifiers, and $R_4$ denotes a resistor. A bias voltage $V_{BB}$ is equal in the absolute value to the output of the amplifier AB in the case where the phase voltage has the rated value ($p = 1$), and it is opposite in the polarity thereto (that is, it is a negative voltage). Since the amplifier $A_1$ adds the output voltage of the amplifier AB and the bias voltage $V_{BB}$ and inverts the polarity of the sum, the output of the amplifier $A_1$ is zero at $p = 1$. As the value $p$ becomes smaller, the positive voltage becomes larger linearly. A diode $D_7$ serves to prevent the output of the amplifier $A_1$ from becoming positive. Accordingly, when the phase voltage of the A.C. system exceeds the rated voltage (at $p > 1$), the output of the amplifier $A_1$ becomes zero. Similarly, the operational amplifier $A_2$ adds three inputs and inverts the polarity of the sum.

The first of the three inputs is the output of the operational amplifier $A_1$, the second is a voltage into which the output current of the current transformer DCCT in FIG. 1 has been converted (that is, the output of the current - voltage converter VI), and the third is a bias voltage $V_{BB}'$.

Although this invention does not specifically intend a control for a variation of a current of the D.C. transmission lines, it is necessary in case of intending to hold the extinction angle constant that, with the increase of the D.C. current, the advanced control angle $\beta$ is linearly increased (the retarded control angle $\alpha$ is linearly decreased). The amplifier $A_2$ is a circuit therefor. Consider the case where the A.C. voltages are of the rated values. In this case, the output of the amplifier $A_1$ is zero. Accordingly, the control voltage $E_c$ of the gate pulse phase shifter (the output voltage of the amplifier $A_2$) changes in dependence on only the value of the D.C. current $I_d$. It is natural that the bais voltage $V_{BB}'$ is made a value at which, when the current of the D.C. transmission lines has the rated value (the A.C. voltages also have the rated values), the control voltage $E_c$ corresponding to the advanced control angle $\beta$ for attaining the prescribed extinction angle $\gamma$ is obtained. When the current of the D.C. transmission lines changes, the advanced control angle $\beta$ increases or decreases in correspondence with the change, and the extinction angle $\gamma$ is maintained substantially constant.

There will now be explained the operation at the voltage change of the A.C. system to which this invention is primarily devoted. Let it be supposed that the current of the D.C. transmission lines is of the rated value. Where the voltages of the A.C. system are of the rated values ($p = 1$), the output of the operational amplifier $A_1$ is zero, and the control voltage $E_c$ becomes the value corresponding to the advanced control angle $\beta$ for attaining the extinction angle $\gamma$ as previously stated. When, for example, the phase-a one-line earthing arises as in FIG. 2 or FIG. 3, the phase voltage $V_a$ drops. In consequence, the positive voltage of the output of the amplifier AB becomes small in the absolute value. Accordingly, the positive output voltage of the amplifier AB becomes smaller in the absolute value than the negative bias voltage $V_{BB}$, and the voltage obtained by adding the voltage $V_{BB}$ and the output voltage of the amplifier AB becomes a negative value. As the quantity $p$ becomes smaller, the sum becomes greater. The output of the operational amplifier $A_1$ is opposite in the polarity to the sum value. Since it is subjected to the addition by the operational amplifier $A_2$, the change of the advanced control angle $\beta$ attendant upon the change of the quantity $p$ becomes as the straight line F shown in FIG. 7, and the purpose is achieved. The value F at $p = 1.0$ turns to a value determined by the current $I_d$ and the voltage $V_{BB}'$, and the positive voltage of the output of the amplifier $A_1$ increases with the decrease of the quantity $p$, so that the control voltage $E_c$ becomes smaller. As the result, the retarded control angle $\alpha$ decreases, while the advanced control angle $\beta$ increases. Constants may be set so that the inclination of the variation may become equal to the inclination of the straight line F in FIG. 7.

When the short-circuit between the phase-a and phase-b arises subsequently, the line voltage $V_{ab}$ drops more, and hence, the output of the bridge $B_4$ is selected. As stated before, the advanced control angle $\beta$ corresponding to the drop width of the line voltage $V_{ab}$ is obtained.

Figure 13:
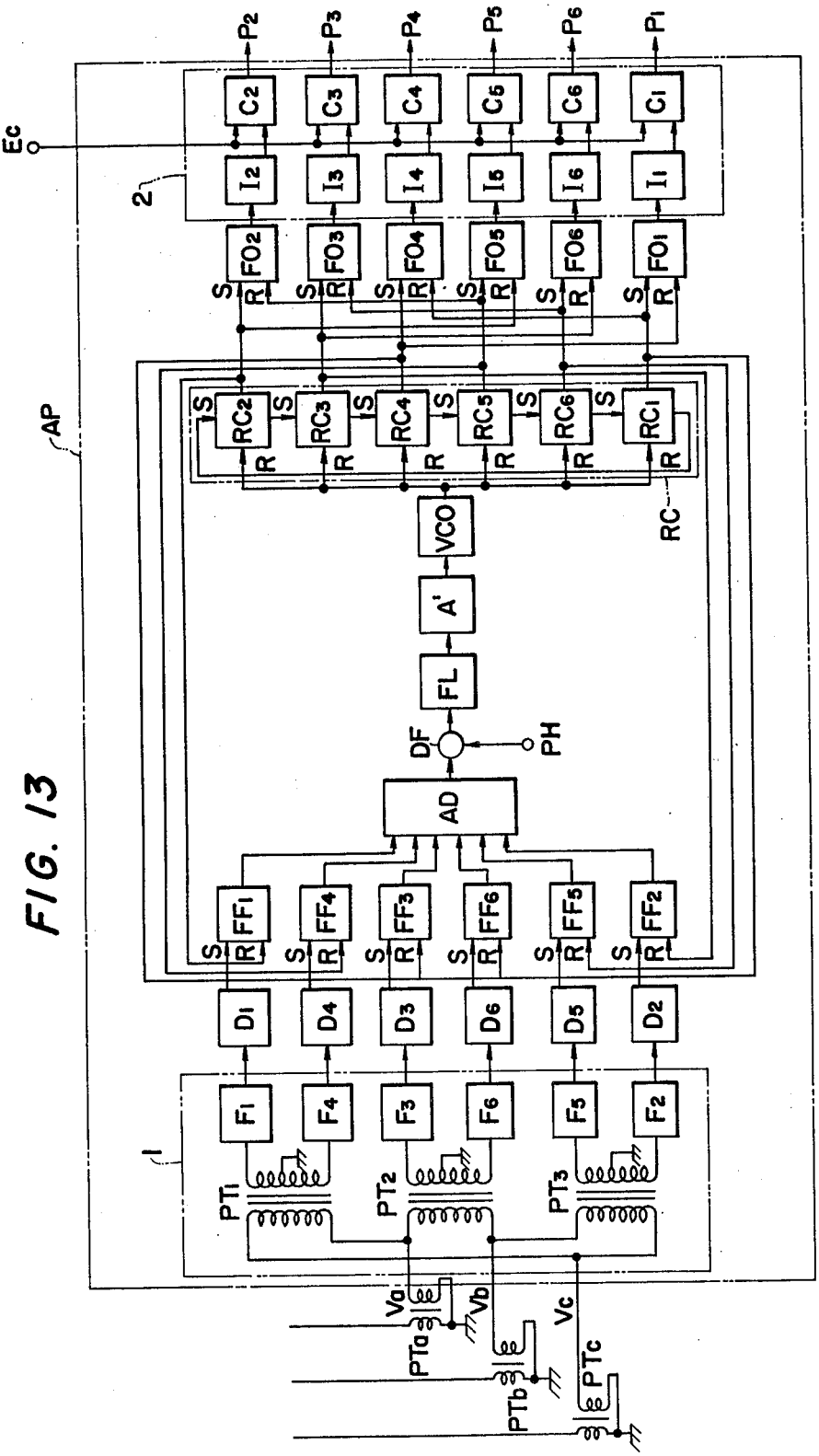

FIG. 13 is a block diagram which shows an example of the gate pulse phase shifter AP. In the figure, $PT_a$; $PT_b$ and $PT_c$ designate the potential transformers shown in FIG. 1, $E_c$ designates a terminal for introducing the output of the operational amplifier $A_2$ shown in FIG. 11, and $P_1$; $P_2$ ... and $P_6$ designate the gate pulses to be applied to the respective arms constructed of the thyristor valves $V_1$; $V_2$ ... and $V_6$.

In the example of FIG. 13, the synchronizing power sources (the line voltages of the A.C. system in the illustrated example) are subjected to the waveform conversion into square waves in a waveform shaping portion 1. The square waves are not directly impressed on a gate pulse phase portion 2. A synchronous oscillator which is synchronized with the synchronizing power sources and which has a frequency being six times higher, is constructed. The output of the oscillator is put by a ring counter into six parts, which are used as synchronous inputs of the gate pulse phase shifting portion 2. According to this example, the change of the output gate pulse phase responsive to the change of the control voltage is highly speedy as in the general gate pulse phase shifter circuits. Moreover, the gate pulse interval is constant because it is determined by the single oscillator. The synchronization may be put into a phasic relation fixed with the voltages of the A.C. system, and requires only to follow a gentle fluctuation of the frequency of the voltages of the A.C. system. Therefore, it is not feared that the synchronization will pull out.

Outputs corresponding to the positive and negative half waves of the respective line voltages of the A.C. system are obtained by the potential transformers $PT_1 - PT_3$ and waveform converter circuits $F_1 - F_6$. The outputs from the circuits $F_1, F_2$ ... and $F_6$ are applied to respectively corresponding differentiation circuits $D_1$, $D_2$ ... and $D_6$. Outputs from flip-flop circuits $FO_1$, $FO_2$ ... and $FO_6$ are applied to respectively corresponding integration circuits $I_1, I_2$ ... and $I_6$. From the differentiation circuits $D_1, D_2$ ... and $D_6$, only positive pulses are derived. They are impressed on set terminals S of flip-flop circuits $FF_1, FF_2$ ... and $FF_6$ at the next stage, and set the flip-flop circuits. These flip-flop circuits are reset in such way that outputs from flip-flop circuits $RC_1, RC_2$ ... and $RC_6$ constituting the ring counter RC are impressed on reset terminals R thereof. The width of the outputs of the six flip-flop circuits $FF_1 - FF_6$ or the magnitude of a voltage corresponding thereto indicates the phase difference between the phase of the synchronizing power sources and that of the ring counter outputs. An adder AD produces a voltage corresponding to a period during which the outputs of the six flip-flop circuits $FF_1 - FF_6$ continue. A differential amplifier DF evaluates the voltage difference between the output of the adder AD and a phase setpoint given at a terminal PH. The output of the differential amplifier DF is smoothed by a filter FL, amplified by a D.C. amplifier A', and applied to a voltage-controlled oscillator VCO. The oscillator VCO oscillates at a frequency which is proportional to the input voltage. The output of the oscillator VCO is applied to the ring counter RC. The flip-flop circuits $RC_1 - RC_6$ constituting the ring counter RC have the output of the oscillator VCO impressed on reset terminals R thereof, and have output change signals of the different ones of the flip-flop circuits $RC_1 - RC_6$ impressed on set terminals S thereof. Only one of the flip-flop circuits $RC_1 - RC_6$ is normally set at 1. Each time the pulse is applied from the oscillator VCO, the position of the state 1 shifts in the order of the suffixes of the flip-flop circuits $RC_1 - RC_6$. The flip-flop circuits $FO_1 - FO_6$ have set terminals S and reset terminals R. The flip-flop circuit $FO_1$ is set by the output of the flip-flop circuit $RC_1$, while it is reset by the output of the flip-flop circuit $RC_4$. The flip-flop circuit $FO_2$ is set by the output of the flip-flop circuit $RC_2$, while it is reset by the output of the flip-flop circuit $RC_5$. The others are similarly operated.

As previously stated, the outputs of the flip-flop circuits $FO_1 - FO_6$ are respectively applied to the integrators $I_1 - I_6$.

The operation of the circuit in FIG. 13 will now be explained.

The mean value of the output of the adder AD is proportional to the difference in phase between the synchronizing power sources and the outputs of the ring counter RC. The terminal PH is given the setpoint of the phase difference. When the ring counter outputs lag over the synchronizing power sources to an amount exceeding the setpoint, the output of the adder AD becomes greater than the voltage of the setpoint terminal PH. The output of the D.C. amplifier A' increases, the frequency of the voltage-controlled oscillator VCO rises, and the phase difference decreases. When the phase of the ring counter outputs leads beyond the setpoint, the frequency of the oscillator VCO lowers conversely, and the phase is retarded. Accordingly, the phase of the outputs of the ring counter RC becomes a value equal to the setpoint given to the set terminal PH and is settled. Where the frequency of the synchronizing power sources varies, the ring counter outputs will gradually deviate with respect to the synchronizing power sources if the frequency of the oscillator VCO is fixed. Consequently, the frequency of the oscillator VCO varies for the same reason as stated above, and the same phasic relation as that before the frequency variation is established. Assuming now that the phases are set at 60°, the output of the flip-flop $RC_2$ is at a position of a lag of 60° over the output of the waveform converter circuit $F_1$ in FIG. 13. Accordingly, the output of the flip-flop $RC_1$ as leads by 60° over that of the flip-flop $RC_2$ is inphase with the output of the waveform converter circuit $F_1$. Since the flip-flop $FO_1$ is set by the flip-flop $RC_1$ and is reset by the flip-flop $RC_4$, it has an output width of 180° as the waveform converter circuit $F_1$ and is inphase with the circuit $F_1$. Likewise, where the synchronizing power sources are balanced, the outputs of the flip-flops $FO_2 - FO_6$ have the same phases and waveforms as those of the waveform converter circuits $F_2 - F_6$. Where the synchronizing power sources become unbalanced, the widths of the outputs of the flip-flops $FF_1 - FF_6$ become respectively different. However, they are smoothed by the filter FL, and the oscillator VCO continues the constant oscillation. Therefore, the outputs of the flip-flops $RC_1 - RC_6$ and accordingly those of the flip-flops $FO_1 - FO_6$ are provided accurately at the interval of 60° and continue by 180°. The characteristic as in FIG. 12 is therefore fulfilled by introducing the outputs of the flip-flops $FO_1 - FO_6$ into the integration circuits $I_1 - I_6$, comparing the outputs of the integration circuits $I_1 - I_6$ with the control voltage $E_c$ by respective comparators $C_1 - C_6$ and producing the pulse outputs in places where they coincide.

When the control voltage $E_c$ is corrected according to the least one of the phase voltages and the line voltages as in FIG. 11, the gate pulse interval-fixing control is satisfied and besides the stable running of the inverter is possible.

Figure 14:
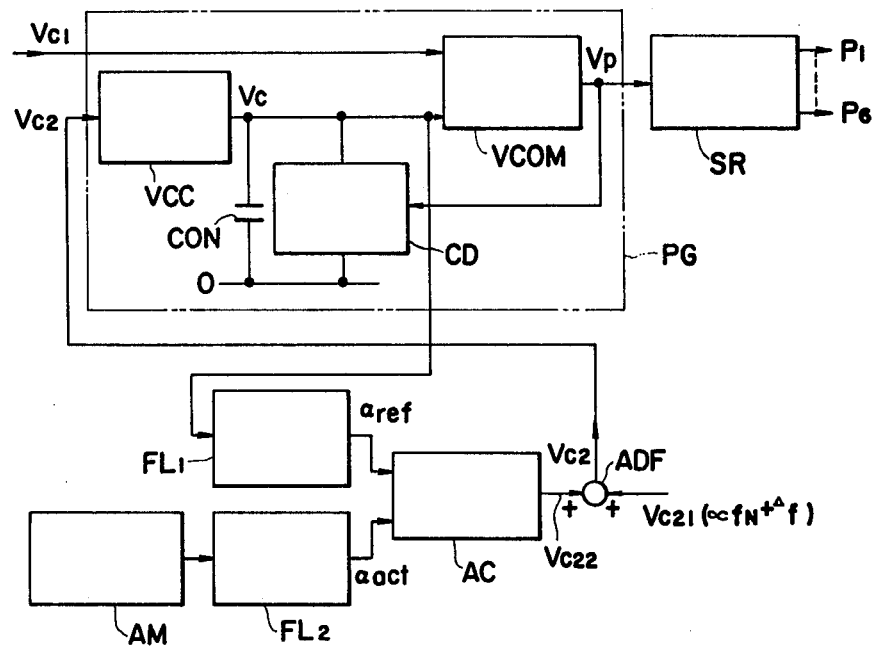
Figure 15:
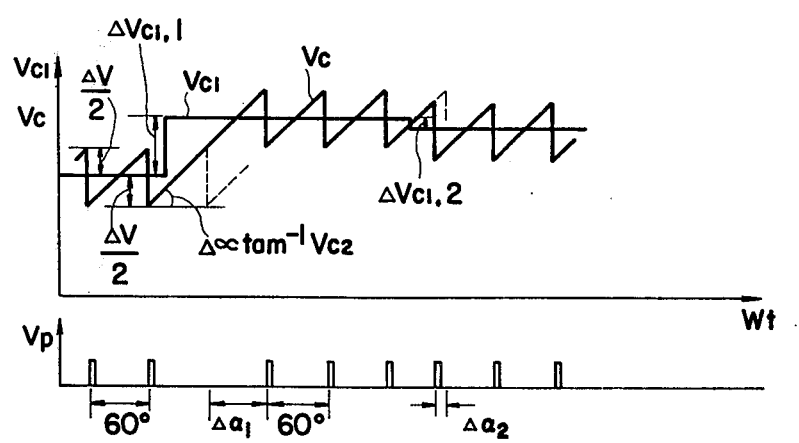
FIG. 15 is a waveform diagram for explaining the operation of the circuit in FIG. 14.

FIG. 14 is a block diagram showing a further example of the gate pulse phase shifter which can be used for this invention. FIG. 15 is a waveform diagram for explaining the operation of the circuit in FIG. 14. The circuit has been published in 'IEEE Summer Power Meeting Paper NO TO 640-PWR,' and it is mentioned herein as the example of the gate pulse phase shifter which can be employed in case of performing this invention.

The operation of a pulse generator PG in FIG. 14 will be described. In the figure, VCC represents a voltage-controlled current source which provides a current of a magnitude proportional to an input voltage $V_{c2}$. CON denotes a capacitor, and VCOM a comparator. The comparator operates and generates a pulse $V_p$ when the terminal voltage $V_c$ of the capacitor CON becomes larger by $\Delta V/2$ than a phase control signal $V_{c1}$. The pulse $V_p$ drives a capacitor discharging circuit CD, to keep the capacitor CON discharged until the terminal voltage $V_c$ becomes smaller by $\Delta V/2$ than the phase control signal $V_{c1}$. The appearance of this operation can be easily apprehended from the waveform diagram in FIG. 15. The velocity $\Delta$ at which the terminal voltage $V_c$ rises is proportional to the output current of the current source VCC and accordingly to the input voltage $V_{c2}$. While the phase control signal $V_{c1}$ is constant, the pulses $V_p$ are generated at an interval of 60°. When the voltage $V_{c1}$ increases as shown at $\Delta V_{c1,1}$ in the figure, the phase of the pulse $V_p$ changes by $\Delta \alpha_1$ in the lagging direction. In contrast, when the voltage $V_{c1}$ decreases as shown at $\Delta V_{c1,2}$, the phase of the pulse $V_p$ instantly leads by $\Delta \alpha_2$. The magnitudes of $\Delta \alpha_1$ and $\Delta \alpha_2$ are proportional to $\Delta V_{c1,1}$ and $\Delta V_{c1,2}$, respectively. Shown at SR is a shift register. It is a circuit which distributes the pulses $V_p$ as the gate pulses to the respective arms of the inverter as constructed of the thyristor valves $V_1 - V_6$. The outputs $P_1 - P_6$ of the circuit SR are the gate pulses of the respective arms of the inverter. The other part of the circuit arrangement in FIG. 14 is a circuit for establishing the synchronization with the voltages of the A.C. system. AM indicates a circuit for measuring the actual retarded control angle $\alpha$ of the inverter. $FL_1$ and $FL_2$ designates filters. As apparent from FIG. 15, the output $\alpha_{ref}$ of the filter $FL_1$ is equal to the phase control signal $V_{c1}$. Accordingly, this value is made a reference value, and an $\alpha$ control circuit AC operates to control the gradient $\Delta$ of the terminal voltage $V_c$ in order that the output $\alpha_{act}$ of the filter $FL_2$ may become equal to the output $\alpha_{ref}$ of the filter $FL_1$. Thus, the pulse generator PG operates in synchronism with the A.C. system to which the inverter is connected. $V_{c21}$ denotes a voltage proportional to the frequency of the A.C. system. It controls the gradient $\Delta$ of the voltage $V_c$ through an adder ADF according to a change of frequency, so as to always obtain the retarded control angle $\alpha$ equal to an electrical angle appointed by the phase control signal $V_{c1}$. Since the time constant of the filter $FL_2$ is set at a large value, the pulse phase shifter in FIG. 14 has the same function as the circuit in FIG. 13. Of course, the control voltage $E_c$ in FIG. 11 is introduced as the control voltage indicated by $V_{c1}$ in FIG. 14.

As described above, in accordance with this invention, the stable running can be ensured even when, in case of employing the pulse phase shifter of the gate pulse interval-fixing control system, the voltage of the A.C. system drops due to any fault arising in the A.C. system.

While the connection of the transformer for the inverter has been explained above as being the star - star ( ⋏ ⋏ ) connection, this invention is applicable without any substantial change to a case where the transformer is of the star - delta ( ⋏ Δ) connection. In this case, there holds the relation that, at the earthing fault, the drop of the phase voltage is larger than the drop of the commutation voltage and that, at the short-circuit fault, the drop of the line voltage is the largest. It is necessary in this case that the phases of the synchronizing power sources to be applied to the gate pulse phase shifter are made different from those in the case of the star - star ( ⋏ ⋏ ) connection.

Where the connection of the transformer for the inverter is the star - star ( ⋏ ⋏ ) connection, the commutation voltage is equal to the line voltage on the primary side of the transformer. As in FIG. 13, therefore, the voltage transformers $PT_a$, $PT_b$ and $PT_c$ are of the star - star ( ⋏ ⋏ ) connection and the voltage transformers $PT_1$, $PT_2$ and $PT_3$ are of the delta - star (Δ ⋏) connection, so that the line voltages of the A.C. system are applied to the waveform converter circuits $F_1 - F_6$.

Where the connection of the transformer for the inverter is the star - delta ( ⋏ Δ) connection, the voltage transformers $PT_a$, $PT_b$ and $PT_c$ in FIG. 13 may be brought to the star - delta ( ⋏ Δ) connection, to form voltages corresponding to the commutation voltages, and the voltage transformers $PT_1$, $PT_2$ and $PT_3$ may be brought to the delta - star (Δ ⋏) connection, to apply the commutation voltages to the waveform converter circuits $F_1 - F_6$.

Since the voltage transformers $PT_a$, $PT_b$ and $PT_c$ are not always used exclusively for the gate pulse phase shifter, they cannot be brought to the star - delta ( ⋏ Δ) connection in some cases. In such cases, a method to be stated below can be relied on. This invention consists in the system of intending to make the control in such way that the voltage phase of the A.C. system in the normalcy is referred to as the phase of the synchronizing power sources. Therefore, it is not necessarily required to employ the commutation voltages as the synchronizing power sources of the gate pulse phase shifter. Where the transformer connection is the star - delta ( ⋏ Δ) connection, the phase voltages $V_a$, $V_b$ and $V_c$ on the A.C. side of the transformer for the inverter as become inphase with the commutation voltages in the normalcy of the A.C. system may be used as the synchronizing power sources without any change.

In this case, both the voltage transformers $PT_a$, $PT_b$ and $PT_c$ and the voltage transformers $PT_1$, $PT_2$ and $PT_3$ in FIG. 13 may be made the star - star ( ⋏ ⋏ ) connection.

While the curve E in FIG. 7 has been approximated by the straight line F in the embodiment of FIG. 13, it is to be understood that a better approximation is achieved by a polygonal line which couples, for example, the value of the curve E at $p = 1.0$, the intersection point between the curves E and C, and the value of the curve E at $p = 0$. Since any well-known polygonal line circuit can be utilized to this end, a concrete example is not specifically explained.

I claim:

1. In a control system for an inverter connected to an A.C. system through a transformer for the inverter, an improved inverter control system comprising:

first means for receiving a control voltage and for generating, at an advanced control angle, phase-shifted gate pulses in synchronism with voltages in-phase with commutation voltages applied to said inverter during the normal condition of said A.C. system, and for applying said gate pulses to respective arms of said inverter at a fixed interval; and second means, responsive to a change in at least one of the phase voltages and line voltages of said A. C. system, for correcting said control voltage in accordance with said change.

2. An improved inverter control system according to claim 1, wherein said first means comprises means for generating said phase-shifted gate pulses in direct synchronism with said commutation voltages.

3. An improved inverter control system according to claim 1, wherein said first means comprises means for generating said phase-shifted gate pulses in direct synchronism with the phase voltages of said A.C. system.

4. An improved inverter control system according to claim 1, wherein said first means comprises means for generating said phase-shifted gate pulses in direct synchronism with the line voltages of said A.C. system.

5. In a control system of an inverter connected to an A.C. system through a transformer for the inverter, an inverter control system comprising an oscillator which outputs an oscillation frequency responsive to an input voltage, first means to divide the output frequency of said oscillator, second means to derive a phase of voltages inphase with commutation voltages being applied to said inverter in the normalcy of said A.C. system, third means to derive a difference in phase between an output of said first means and an output of said second means, fourth means to convert an outut of said third means into a voltage and to add thereto a signal for regulating into a predetermined relation the output phase of said oscillator and said phase of said voltages inphase with said commutation voltages, thus to bring the sum voltage to said input voltage of said oscillator, and a gate pulse phase shifter into which a control voltage for regulating a phase to output gate pulses thereat is introduced and which outputs said gate pulses at an advanced control angle corresponding to said control voltage, said control voltage being corrected by the use of a least one of phase voltages or line voltages of said A.C. system.

6. The inverter control system according to claim 5, wherein said voltages inphase with said commutation voltages, said commutation voltages themselves are adopted.

7. The inverter control system according to claim 5, wherein as said voltages inphase with said commutation voltages, said phase voltages or line voltages of said A.C. system are adopted.

8. In a control system of an inverter connected to an A.C. system through a transformer for the inverter, an inverter control system comprising a gate pulse phase shifter including a capacitor whose charging speed is controlled by a current dependent upon a voltage corresponding to a frequency of said A.C. system and a retarded control angle of said inverter, and a circuit which, when a charging voltage of said capacitor and a control voltage are compared and are in a predetermined relation, outputs gate pulses and controls discharging of said capacitor, said control voltage being corrected by the use of a least one of phase voltages or line voltages of said A.C. system.

* * * * *

UNITED STATES PATENT OFFICE
CERTIFICATE OF CORRECTION

Patent No. 4,028,607                               Dated June 7, 1977

Inventor(s) Atsumi Watanabe

It is certified that error appears in the above-identified patent and that said Letters Patent are hereby corrected as shown below:

Sheet 7, Figure 13, delete the line connecting the R inputs to flip-flop 3 and flip-flop 6.

Priority data omitted. Should read

--Japan        No. 44509/74        April 22, 1974--

Signed and Sealed this

Sixteenth Day of May 1978

[SEAL]

Attest:

RUTH C. MASON
Attesting Officer

LUTRELLE F. PARKER
Acting Commissioner of Patents and Trademarks